March 25, 1930.      W. J. LA TOURRETTE      1,751,481
DANDELION CUTTER AND LIFTER
Filed June 16, 1928
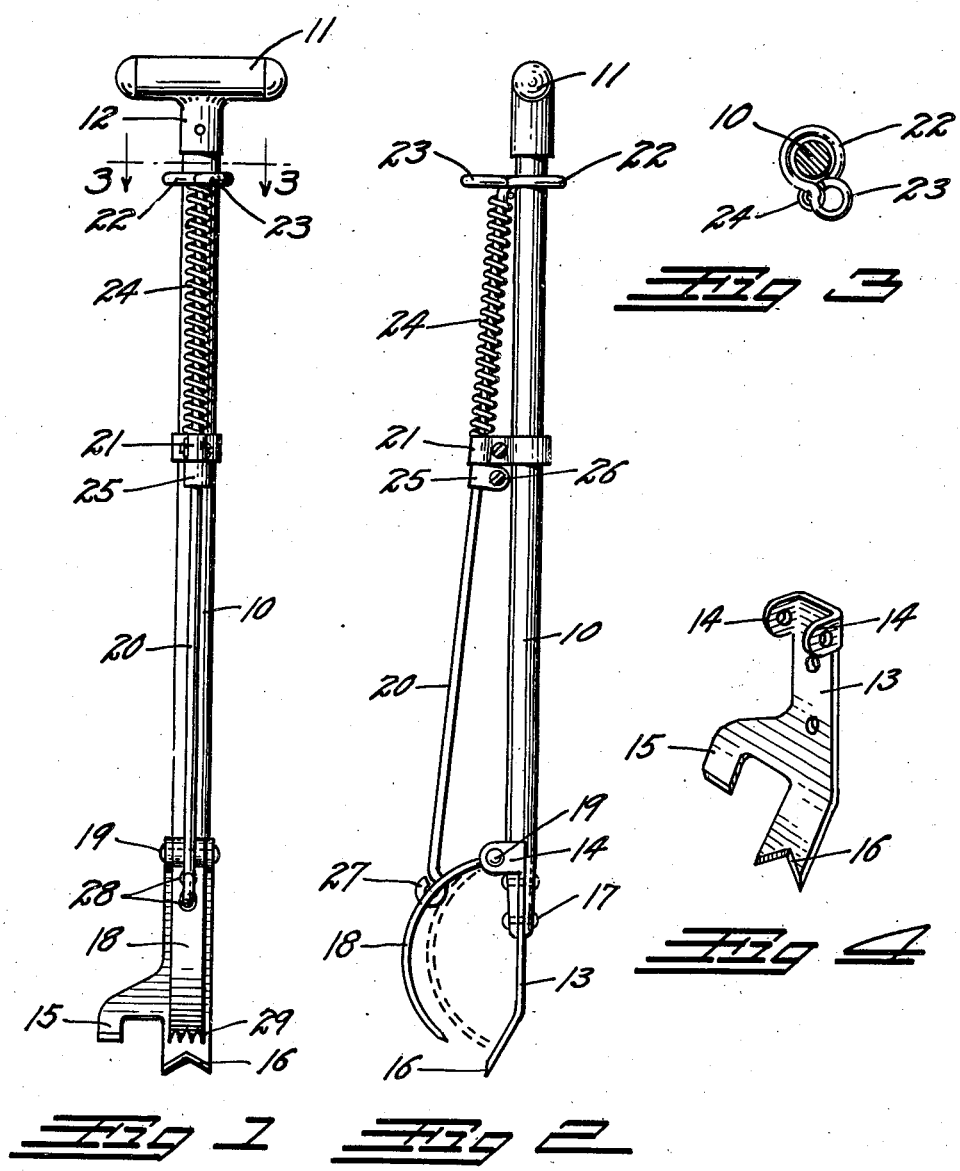
Inventor
WILLETT J. LA TOURRETTE Patented Mar. 25, 1930

1,751,481

UNITED STATES PATENT OFFICE

WILLETT J. LA TOURRETTE, OF DENVER, COLORADO

DANDELION CUTTER AND LIFTER

Application filed June 16, 1928. Serial No. 285,935.

This invention relates to a hand weed cutter and lifter and while more particularly designed for removing dandelions from lawns, it is not necessarily limited to this application, but will find use wherever it is desired to cut the tops of plants from the roots and lift the tops.

The principal object of the invention is to so construct the device that by twisting or turning the handle the cutting blade is rotated into the plant root so as to sever it from the top and loosen the top from the sod.

Another object of the invention is to provide a clamping member to engage and lift the plant top, which is operated by a downward motion so that the act of forcing the cutter into the ground will simultaneously result in engaging the top so that it can be readily lifted.

A further object of the invention is to construct the device so that it can be operated with one hand leaving the other hand free to remove the dandelions from the lifter or to hold a container for the dug dandelions.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a front elevation of my improved weed cutter and lifter.

Fig. 2 is a side elevation of the same.

Fig. 3 is a detail cross section through the handle taken on the line 3—3, Fig. 1.

Fig. 4 is a perspective view of the blade portion of the cutter.

Fig. 5 is a diagram illustrating the blade action resulting from a twisting motion on the handle.

The invention comprises a handle 10, preferably but not necessarily of wood, provided with a hand grip 11. The handle 10 fits into a socket 12 formed on the hand grip 11. The lower extremity of the handle 10 is bifurcated to receive a blade member 13, illustrated in detail in Fig. 4. The blade member 13 is provided with a cutting blade 16, two outwardly turned ears 14 and, what might be termed, a pivot blade 15. The pivot blade 15 is positioned to one side of and in alignment with the main cutting blade 16.

The blade member 13 is attached to the handle 10 by being passed into the bifurcation therein and secured with suitable rivets or bolts 17. The lower extremity of the blade 13 and the pivot blade 15 are both turned forwardly at an angle so that, when the handle is forced downwardly, the blade will travel into and under the dandelion.

A clamping member 18 is hinged on a hinge pin 19 between the ears 14 and is operated by means of a rod 20 which extends upwardly through a guide 21 to a position immediately below the hand grip 11.

At the top, the rod 20 is formed in a horizontal ring 22 which surrounds the handle and terminates in a small thumb ring 23. A compression spring 24 is compressed between the guide 21 and the ring 22 of the handle. The clamping member 18 is preferably formed from spring steel so that, if it is accidentally bent, it will spring back to its original position.

In use, the cutting edge 16 is positioned in front of a dandelion and the handle is forced downwardly. This causes the blade 16 to travel into and cut the root below the ground surface. The handle is now twisted so as to cause the cutting edge 16 to rotate about the pivot blade 15, as illustrated in Fig. 5. This forces the cut plant loose from the ground and from the surrounding sod. The operator's thumb now depresses the ring 23 to close the clamping member 18 and clamp the plant between it and the blade 13. The plant can now be lifted and removed from the device by the operator's other hand.

The upward movement of the rod 20 is limited by means of a stop 25 which is clamped to the rod by means of a suitable clamping screw 26. The position of the stop 25 can be changed so as to allow the clamping member 18 to open to any desired extent. A ring 27 is formed on the lower extremity of the rod 20 which passes through adjacent openings 28 in the clamping member 18 and forms a hinge or bearing for the lower rod extremity. The clamping member 18 is preferably provided with teeth 29 to facilitate its engagement with the plant. The cutting edge 16 is beveled inwardly so as to form two outside points. By this construction the blade is self-aligning, that is, if it does not engage the root exactly in the center of the blade the root will slide along these beveled surfaces and automatically position itself with respect to the blade.

It is desired to call attention to the fact that the pivot blade 15 is one of the principal features of the invention. It is often difficult to remove a dandelion or other weed from the entangled grass and sod, even though its root has been cut. If it is attempted to pull the plant upwardly by a clamping device it will often be pulled from the device. By the use of the pivot blade 15, however, the plant is not directly lifted from the sod but is first loosened and twisted therefrom by rotating the device about the pivot blade 15, which greatly facilitates its removal.

It is also desired to call attention to the fact that the clamping action of the invention operates from a downward push and not from an upward pull as is usual in devices of this character. When operated from an upward pull the hold on the dandelion is usually released as soon as it releases from the sod, thus dropping the plant and requiring a second operation on the part of the operator to pick it up. In the present invention the dandelion is not released until the operator releases his thumb from the thumb ring 23.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A device for cutting the root of and lifting a dandelion comprising: a handle; a blade secured to the lower extremity of said handle; a cutting edge on said blade; and a second blade formed on said first blade and positioned to one side thereof; ears turned outwardly on said blade; a clamping member; and a hinge pin securing said clamping member between said ears.

2. A device for cutting the root of and lifting a dandelion comprising: a handle; a blade secured to the lower extremity of said handle; a cutting edge on said blade; a second blade arranged to act as a ground pivot for said first blade; ears turned outwardly on said first blade; a clamping member hinged between said ears; an operating rod extending upwardly along said handle; and a ring formed on the lower extremity of said operating rod so as to pass through adjacent openings in said clamping member.

3. A device for cutting the root of and lifting a plant comprising: a handle; a relatively long blade secured to the lower extremity of said handle; a second blade positioned to one side of said first blade, said second blade being relatively shorter than said first blade, so that as said first blade deeply penetrates the ground said second blade will but slightly enter said ground; and means for forcing said plant into contact with said first blade.

4. A device for cutting the root of and lifting a plant comprising: a handle; a relatively long blade secured to the lower extremity of said handle; a second blade positioned to one side of said first blade, said second blade being relatively shorter than said first blade, so that as said first blade deeply penetrates the ground said second blade will but slightly enter said ground, said first blade lying substantially on the axis of said handle, said second blade being positioned to one side of said axis; and means for forcing said plant into contact with said first blade.

In testimony whereof, I affix my signature.

WILLETT J. LA TOURRETTE.